(12) United States Patent
Alfayad et al.

(10) Patent No.: US 9,327,785 B2
(45) Date of Patent: May 3, 2016

(54) HUMANOID ROBOT IMPLEMENTING A BALL AND SOCKET JOINT

(75) Inventors: Samer Alfayad, Bourg la Reine (FR); Fathi Ben Ouezdou, Bourg la Reine (FR); Fayçal Namoun, Courbevoie (FR)

(73) Assignee: BIA, Conflans Ste Honorine (FR)

( * ) Notice: Subject to any disclaimer, the term of this patent is extended or adjusted under 35 U.S.C. 154(b) by 284 days.

(21) Appl. No.: 12/991,443

(22) PCT Filed: May 11, 2009

(86) PCT No.: PCT/EP2009/003340
§ 371 (c)(1),
(2), (4) Date: Mar. 9, 2011

(87) PCT Pub. No.: WO2009/135694
PCT Pub. Date: Nov. 12, 2009

(65) Prior Publication Data
US 2011/0147103 A1    Jun. 23, 2011

(30) Foreign Application Priority Data
May 9, 2008 (FR) ...................................... 08 53061

(51) Int. Cl.
*B25J 17/00* (2006.01)
*B62D 57/032* (2006.01)
*B25J 17/02* (2006.01)

(52) U.S. Cl.
CPC ........... *B62D 57/032* (2013.01); *B25J 17/0283* (2013.01); *Y10T 74/20329* (2015.01); *Y10T 74/20335* (2015.01)

(58) Field of Classification Search
CPC .............................. B25J 17/028; B62D 57/032
USPC ....................................... 74/490.05; 180/8.1–5
See application file for complete search history.

(56) References Cited

U.S. PATENT DOCUMENTS

| 4,556,360 A * | 12/1985 | Hoffmann ...................... 414/701 |
| 5,044,360 A * | 9/1991 | Janke ............................... 602/16 |
| 5,410,944 A * | 5/1995 | Cushman ......................... 91/520 |
| 6,472,839 B1 * | 10/2002 | Ishii et al. ................ 318/568.12 |
| 6,602,042 B2 * | 8/2003 | Roy et al. ....................... 414/735 |

(Continued)

FOREIGN PATENT DOCUMENTS

EP    1433694    6/2004

OTHER PUBLICATIONS

Hoshino, K. et al.: "Mechanism of humanoid robot arm with 7 DOFs having pneumatic actuators;" IEICE Transactions on Fundamentals of Electronics, Communications and Computer Sciences Inst. Electron. Inf. & Commun. Eng. Japan, [Online] vol. E89-A, No. II, Nov. 2006, pp. 3290-3297, XP002538761.

(Continued)

*Primary Examiner* — William Kelleher
*Assistant Examiner* — Zakaria Elahmadi
(74) *Attorney, Agent, or Firm* — Baker and Hostetler LLP

(57) ABSTRACT

The invention relates to a humanoid robot comprising two elements connected by a spherical joint with three degrees of freedom in rotation, the joint being moved by three actuators each acting in one of the three degrees of freedom. The invention is of particular use in the production of humanoid robots coming as close as possible to the human anatomy. According to the invention, the first and the second of the actuators act in parallel and the third of the actuators acts in series with the first and the second of the actuators.

15 Claims, 10 Drawing Sheets

(56) References Cited

U.S. PATENT DOCUMENTS

| | | | |
|---|---|---|---|
| 6,658,962 B1* | 12/2003 | Rosheim | 74/490.05 |
| 6,832,131 B2* | 12/2004 | Hattori et al. | 700/245 |
| 6,871,563 B2* | 3/2005 | Choset et al. | 74/490.05 |
| 6,898,485 B2* | 5/2005 | Kuroki et al. | 700/245 |
| 6,901,313 B2* | 5/2005 | Mori et al. | 700/245 |
| 6,917,175 B2* | 7/2005 | Hattori et al. | 318/567 |
| 6,948,400 B2* | 9/2005 | Nakamura et al. | 74/490.05 |
| 7,099,743 B2* | 8/2006 | Lee et al. | 700/245 |
| 7,178,421 B2* | 2/2007 | Filipiak et al. | 74/490.05 |
| 7,240,747 B2* | 7/2007 | Miyazaki et al. | 180/8.6 |
| 7,273,488 B2* | 9/2007 | Nakamura et al. | 606/205 |
| 7,454,995 B2* | 11/2008 | Koyama et al. | 74/490.05 |
| 7,581,465 B2* | 9/2009 | Sugawara et al. | 74/490.05 |
| 7,691,098 B2* | 4/2010 | Wallace et al. | 606/1 |
| 7,765,892 B2* | 8/2010 | Li | 74/490.05 |
| 7,938,038 B2* | 5/2011 | Sugawara et al. | 74/490.04 |
| 8,047,094 B2* | 11/2011 | Love et al. | 74/490.05 |
| 8,322,250 B2* | 12/2012 | Kim et al. | 74/490.05 |
| 2002/0061504 A1* | 5/2002 | Saijo et al. | 434/268 |
| 2002/0079857 A1* | 6/2002 | Ishii et al. | 318/568.12 |
| 2003/0101838 A1* | 6/2003 | Shinozaki | 74/490.05 |
| 2008/0127768 A1* | 6/2008 | Shirai et al. | 74/490.05 |
| 2009/0071282 A1* | 3/2009 | Takemura | 74/490.05 |
| 2009/0200090 A1* | 8/2009 | Takanishi et al. | 180/8.6 |
| 2009/0211390 A1* | 8/2009 | Brogardh et al. | 74/490.03 |
| 2010/0037720 A1* | 2/2010 | Rosheim | 74/490.03 |
| 2010/0139437 A1* | 6/2010 | Ichikawa et al. | 74/490.05 |
| 2010/0154579 A1* | 6/2010 | Nakamura | 74/490.05 |
| 2011/0067520 A1* | 3/2011 | Ihrke et al. | 74/490.05 |
| 2011/0067521 A1* | 3/2011 | Linn et al. | 74/490.06 |
| 2011/0314950 A1* | 12/2011 | Mamba | 74/490.05 |

OTHER PUBLICATIONS

Sebastian Lohmeier, et al.: "Leg Design for a Humanoid Walking Robot" Humanoid Robots, 2006 6th IEEE-RAS International Conference on, IEEE, PI, Dec. 1, 2006, pp. 536-541, XP031053073.

Zhou Zhang, et al.: "Kinematics Analysis of a Humanoid Leg With Redundancy Freedom" Mechatronics and Automation, Proceedings of the 2006 IEEE Internationa L Conference on, IEEE, PI, Jun. 1, 2006, pp. 1080-1085, XP031026922.

Olcucuoglu, 0. et al.: "i-RoK: A human like robotic head" Humanoid Robots, 2007 7th IEEE-RAS International Conference on, IEEE, Piscataway, NJ, USA, Nov. 29, 2007, pp. 442-446, XP031448881.

* cited by examiner

HUMANOID ROBOT IMPLEMENTING A BALL AND SOCKET JOINT

CROSS-REFERENCE TO RELATED APPLICATIONS

This application is a National Stage of International patent application PCT/EP2009/003340, filed on May 11, 2009, which claims priority to foreign French patent application No. FR 08 53061, filed on May 9, 2008, the disclosures of which are incorporated by reference in their entirety.

FIELD OF THE INVENTION

The invention relates to a humanoid robot using a spherical joint. The invention is of particular use in the production of humanoid robots coming as close as possible to the human anatomy.

BACKGROUND OF THE INVENTION

A mathematical model modeling this anatomy was developed in the 1960s in the United States by Aerospace Medical Research Laboratories in Dayton, Ohio. This model, well known as the Hanavan model, describes in a parametric manner, in relation to a given human size and weight, the dimensions of all the parts of the body. In particular, the ankle is described as a joint having three degrees of freedom in rotation. The dimensions of the leg, the part of the body extending between the knee and the ankle, are also described. For example, for a 14-year-old adolescent, 1.6 m tall, and weighing 50 kg, the leg can be represented by a truncated cone with a height of 392 mm, with 29 mm for the small radius and with 47 mm for the large radius. The foot is modeled by a set of rectangular parallelepipeds of which the overall length is 243 mm, the width is 80 mm, the heel height is 62 mm, and the distance between the back of the foot and the connection to the ankle is 72 mm. The height of the leg is defined as the distance between the ankle joint and that of the knee.

At the present time, many humanoid robots have been developed, but none of them complies with the Hanavan model, notably in the space requirement of the leg. For example, robots are found in which the ankle is reduced to an universal joint type, that is to say comprising only two degrees of freedom, a rotation in the sagittal plane and a rotation in the frontal plane. Moreover, the actuation mechanisms used to motorize these two degrees of freedom extend beyond the dimensions specified in the Hanavan model.

The design of the ankle is one of the most difficult problems in the design of a humanoid robot. This is due on the one hand to the fact that the ankle is the joint that needs the most torque in the locomotive apparatus and, on the other hand, because of the constraints of size and weight. For example, a dynamic calculation shows that, to achieve a walk at a speed of 1.2 m/s, for a 1.6 m and 50 kg robot, it is necessary to produce a torque of almost 80 N·m for the rotation in the sagittal plane, with a speed of 4.5 rad/s and an joint range of movement of minus ten degrees to plus thirty degrees.

SUMMARY OF THE INVENTION

An object of the invention is to improve the extent to which a robot accurately reproduces the human anatomy, for example modeled on the Hanavan model. The invention is not limited to the production of an ankle. The invention applies to any spherical joint used in a humanoid robot.

It is therefore an object of the present invention to provide a humanoid robot comprising two elements connected by a spherical joint with three degrees of freedom in rotation, the joint being moved by three actuators each acting on one of the three degrees of freedom, wherein the first and the second of the actuators act in parallel and wherein the third of the actuators acts in series with the first and the second of the actuators. This type of joint is called hybrid in the sense that it combines a parallel mechanism and a serial mechanism. Its usefulness lies in combining the advantages of the two conventional families of serial mechanisms on the one hand and of parallel mechanisms on the other hand.

The invention can be applied to an ankle of the humanoid robot, the ankle connecting a leg and a foot of the robot, the ankle comprising a joint between the leg and the foot, characterized in that the ankle comprises three actuators placed in the leg making it possible to move the joint each in a rotation of the ankle on one axis, and in that the axes of the three rotations are distinct and intersecting.

In the case of the ankle, by virtue of three degrees of freedom respectively, in the frontal plane, the sagittal plane and a horizontal plane, the walk of a humanoid robot using an ankle according to the invention will be much more anthropomorphic than that of a robot in which the ankle has only two degrees of freedom.

BRIEF DESCRIPTION OF THE DRAWINGS

The invention will be better understood and other advantages will appear on reading the detailed description of an embodiment given as an example, the description being illustrated by the appended drawing in which.

In the interests of clarity, the same elements will bear the same reference numbers in the various figures.

DETAILED DESCRIPTION

A humanoid robot according to the invention may comprise one or more spherical joints according to the invention. The joint links two elements which, in the case of the ankle, are a leg and a foot. In the case of the neck, the two elements are a body and a head of the robot. In the case of the wrist, the two elements are a forearm and a hand of the robot.

Figure 1:
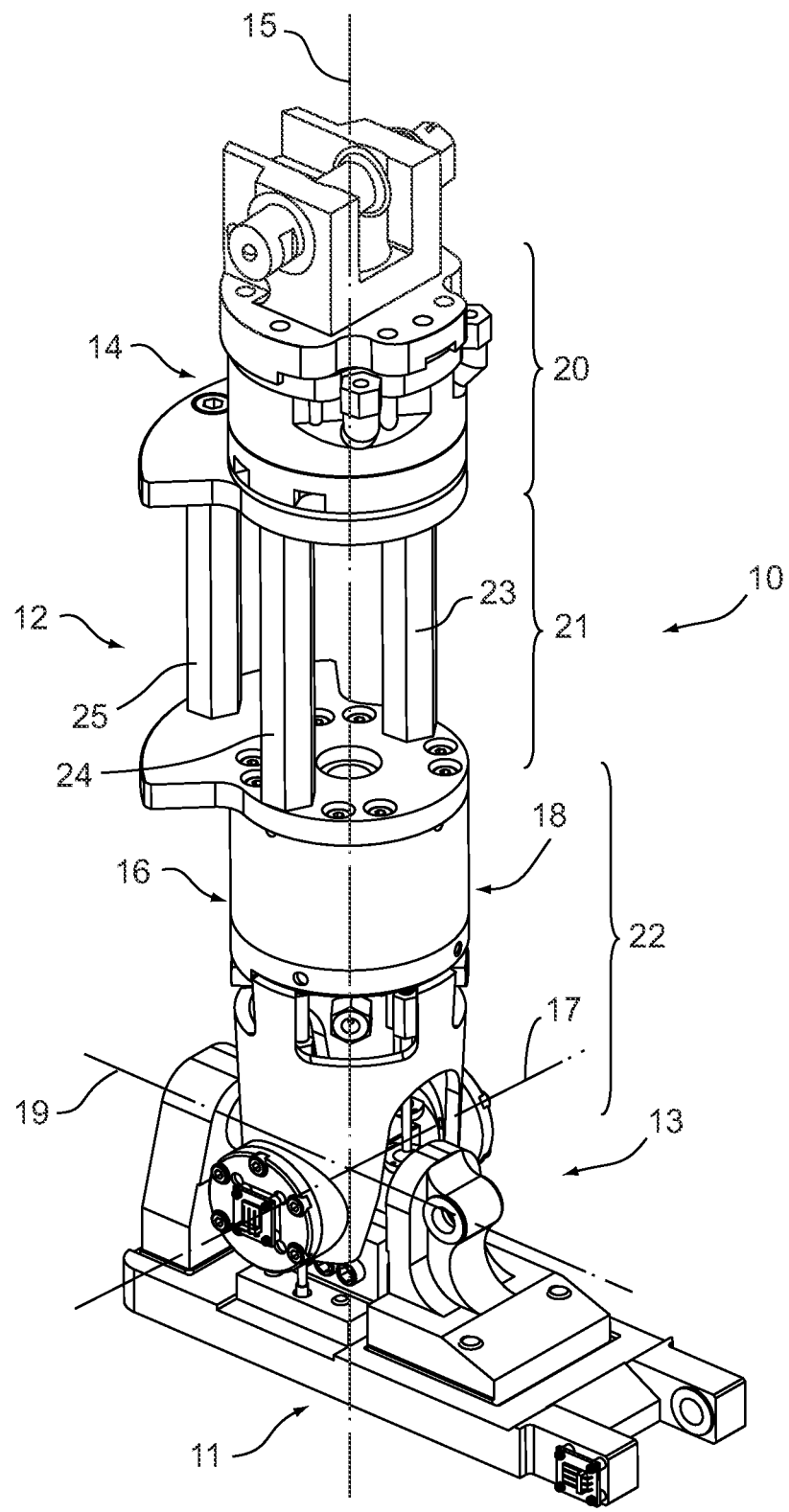
FIG. 1 represents in perspective an ankle according to the invention.

FIG. 1 represents an ankle 10 according to the invention. By convention, an ankle is specified as being an assembly comprising a foot 11, a leg 12 and a joint 13 between the leg 12 and the foot 11.

The ankle 10 comprises three actuators placed in the leg 12. The actuators can use hydraulic or electric power. A first actuator 14 allows the ankle to rotate about a vertical axis 15. A second actuator 16 allows the ankle to rotate about a sagittal axis 17 and a third actuator 18 allows the ankle to rotate about a frontal axis 19. The three axes 15, 17 and 19 are distinct and intersecting. In the example shown, the three axes 15, 17 and 19 are perpendicular. By convention, the sagittal axis is specified as an axis perpendicular to the sagittal plane, the plane in which the walking movement mainly takes place. Similarly, the frontal axis is specified as an axis perpendicular to the frontal plane of the robot. The frontal plane is perpendicular to the sagittal plane.

The first actuator 14 is situated above the other two actuators 16 and 18 which are situated substantially on the same level of the leg 12. More precisely, the leg 12 comprises three zones. The actuator 14 is situated in an upper zone 20 and the actuators 16 and 18 are situated in a lower zone 22. The actuators 16 and 18 advantageously act in parallel on the foot 11. This action in parallel makes it possible to prevent one of the actuators from supporting the other, as is the case in most known robots. The actuator 14 acts in series on the assembly formed by the two actuators 16 and 18.

More generally, the actuator 18 is placed upstream of the actuators 14 and 16 relative to the body of the robot and advantageously the three actuators 14, 16 and 18 are placed in the element furthest upstream relative to the body.

Figure 2:
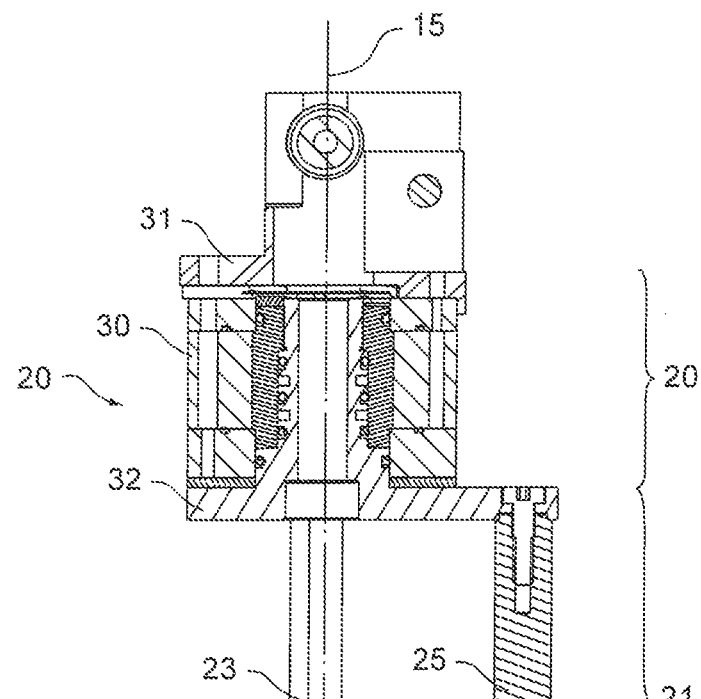
FIG. 2 represents the ankle in section in a sagittal plane.
Figure 2:
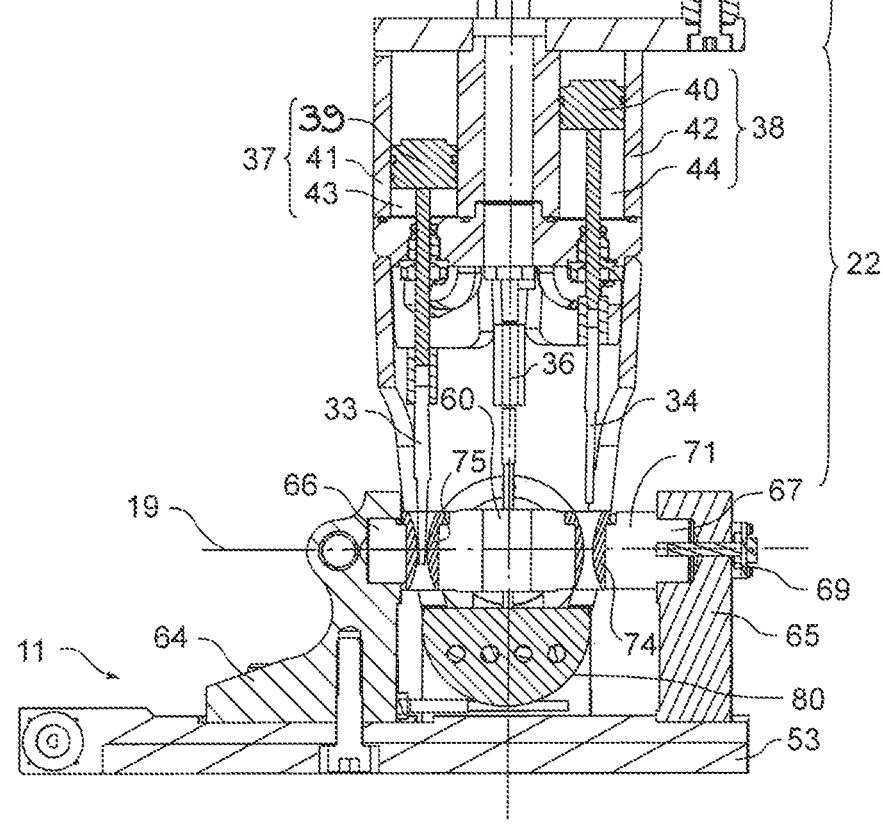

A middle zone 21 situated between the zones 20 and 22 contains no actuator and is, for example, available for receiving one or more hydraulic pumps making it possible to power the actuators 14, 16 and 18. In FIG. 2, three rods 23 to 25 are used to maintain the rigidity of the middle zone 21.

The middle zone 21 has a characteristic dimension, in a plane perpendicular to the axis 15, greater than the same dimensions of the upper zone 20 and lower zone 22. These three dimensions form part of the Hanavan model, the middle zone 21 forming a calf of the leg 12.

FIG. 2 represents an ankle 10 in section in a vertical plane containing the axis 15. This is a sagittal plane. The actuator 14 situated in the upper zone 20 advantageously comprises a rotary hydraulic motor comprising a stator 30 secured to a bottom portion 31 of a knee and to a rotor 32 that can move in rotation about the axis 15 relative to the stator 30. The rods 23 to 25 are secured to the rotor 32.

In FIG. 2, in the lower zone 22, only the actuator 16 allowing the foot 11 to move about the sagittal axis 17 is shown. Advantageously, the actuator 16 is linear and acts by means of tie-rods 33 and 34 attached on the one hand to the actuator 16 and on the other hand to the foot 11. Similarly the actuator 18 is linear and acts by means of tie-rods 35 and 36. The actuator 18 is not in the plane of FIG. 2 and only the tie-rod 36 appears. The use of tie-rods acting between the actuators and the foot 11 means that the actuators can act in parallel and not in series.

Advantageously, the actuators 16 and 18 each comprise two single-acting cylinders each acting as a tie-rod on the foot 11. For the actuator 16, the cylinders 37 and 38 each comprise a piston, respectively 39 and 40, moving in a respective liner 41 and 42. The cylinders 37 and 38 each comprise a chamber, respectively 43 and 44, powered by a hydraulic fluid. This fluid is for example supplied by a hydraulic pump placed in the middle zone 21. When a pump is associated with a single actuator, in this instance the actuator 16, the pump draws the fluid into one of the chambers 43 or 44 in order to discharge the fluid into the other chamber depending on the direction of angular movement of the foot 11 about the axis 17.

Advantageously, the pistons of the linear actuators 16 and 18 move on vertical axes parallel to the axis 15. More generally, the axes of the pistons are parallel. This arrangement of the pistons allows the ankle to be better included in the dimensions of the Hanavan model. This arrangement also makes it possible to limit the inertia of the ankle 10 during its various rotations and during the rotation of the knee.

Figure 3:
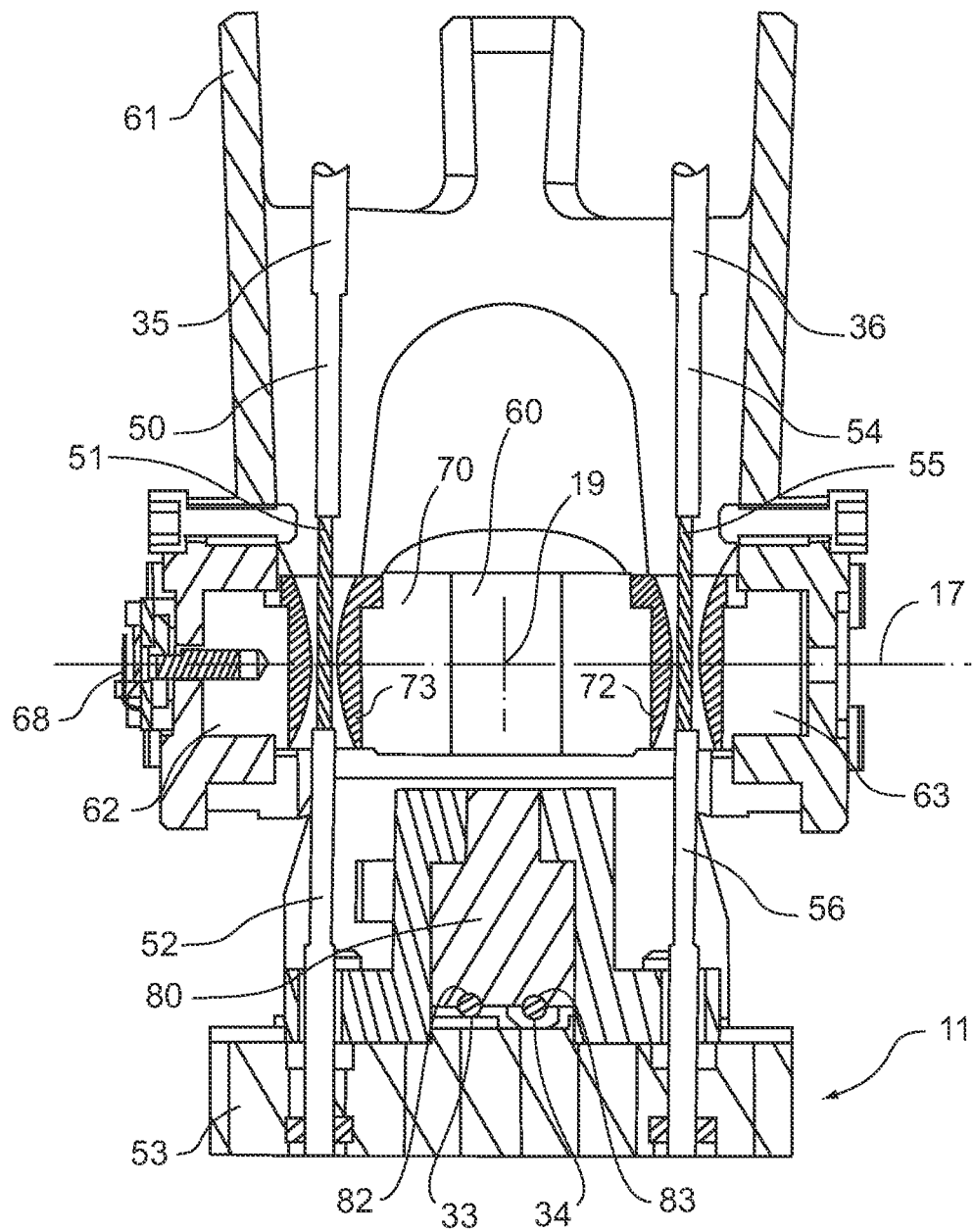
FIG. 3 represents the ankle in section in a frontal plane.

FIG. 3 represents a partial section of the ankle 10 in a frontal plane. The tie-rods 35 and 36 may each comprise a cable crimped at its ends into sleeves. The tie-rod 35 comprises a first sleeve 50 secured to one of the pistons of the actuator 18, a cable 51 and a second sleeve 52 secured to a sole 53 belonging to the foot 11. Similarly, the tie-rod 36 comprises a first sleeve 54 secured to one of the pistons of the actuator 18, a cable 55 and a second sleeve 56 secured to the sole 53. When the cylinders of the actuator 18 pull on one of the tie-rods 35 or 36, relaxing the force on the other, the sole 53 rotates about the axis 19 perpendicular to FIG. 3. Similarly, the tie-rods 33 and 34 connected to the actuator 16 may each comprise a cable. The use of a cable allows the tie-rod concerned to follow the rotary movement of the foot by deforming. The use of cables also provides a certain longitudinal flexibility of the tie-rods allowing the ankle 10 to cushion possible vertical impacts due to the placing of the foot 11 on the ground with each step. It is possible to provide a turnbuckle making it possible to adjust its length.

The joint 13 allowing the foot 11 to rotate on the two axes of rotation 17 and 19 comprises a cross-piece 60 that can rotate about the axis 17 relative to the leg 12 and about the axis 19 relative to the foot 11. More precisely, the cross-piece 60 rotates about the axis 17 relative to a housing 61 of the actuators 16 and 18 in which the chambers of the cylinders, notably the cylinders 37 and 38, are made. The housing 61 is secured to the rods 23, 24 and 25. Two bearings 62 and 63 placed between two ends of the cross-piece 60 and the housing 61 guide the rotation of the cross-piece 60 about the axis 17.

Moreover, the cross-piece 60 rotates about the axis 19 relative to the two uprights 64 and 65 of the foot 11. The uprights 64 and 65 are secured to the sole 53. The upright 64 stands at an anterior and upper portion of the foot called a toe-kick and the upright 65 stands at the heel. A bearing 66 guides the rotation of the cross-piece 60 about the axis 19 relative to the upright 64 and a bearing 67 guides the rotation of the cross-piece 60 about the axis 19 relative to the upright 65.

The ankle 10 advantageously comprises means for measuring the angular range of movement of the foot about its two axes of rotation 17 and 19 relative to the leg 12. Accordingly use is made, for example, of two potentiometers 68 and 69 measuring the angular range of movement of the cross-piece 60 at the bearings, respectively 62 and 67.

The cross-piece 60 comprises two branches 70 and 71, the branch 70 extending along the axis 17 between the bearings 62 and 63 and the branch 71 extending along the axis 19 between the bearings 66 and 67. The tie-rods 35 and 36 pass through the cross-piece 60 at the branch 70 and the tie-rods 33 and 34 pass through the cross-piece 60 at the branch 71. To allow the traversing of the cross-piece 60, each branch 70 and 71 comprises two bushes, 72 and 73, for the branch 70, and 74 and 75 for the branch 71. Each tie-rod can slide in a bush when the cylinders are actuated. In order to allow the cross-piece 60 to rotate about its two axes 17 and 19, the walls of the various bushes advantageously have the shape of a torus portion substantially tangential with the tie-rod which passes through the corresponding bush. The shape like a portion of a torus also allows the cables 51 and 55 of the tie-rods 35 and 36 to rest on the walls of the corresponding bushes when the foot 11 rotates.

Advantageously, one of the actuators allowing the rotation of the foot about the frontal axis and the sagittal axis is operated by means of a cable and of an angle transmission. This angle transmission is mainly useful for the rotation about the sagittal axis 17 in order to increase the maximum angular range of movement possible for the joint 13 about this axis, and the torque transmitted by the corresponding tie-rod.

Accordingly, the foot comprises a circular plate portion 80 with an axis 81 parallel to the axis 17 and situated beneath the latter. The circular plate 80 is secured to the foot 11. The tie-rods 33 and 34 roll on the periphery of the circular plate 80 and the sleeve attached to the foot 11, belonging to each tie-rod 33 and 34, extends parallel to the axis 19 in order to be attached in each of the uprights, respectively 65 and 64. FIG. 3 shows two grooves 82 and 83 made in the circular plate 80. Each of the grooves 82 and 83 makes it possible to guide one of the tie-rods respectively 33 and 34.

Figure 4:
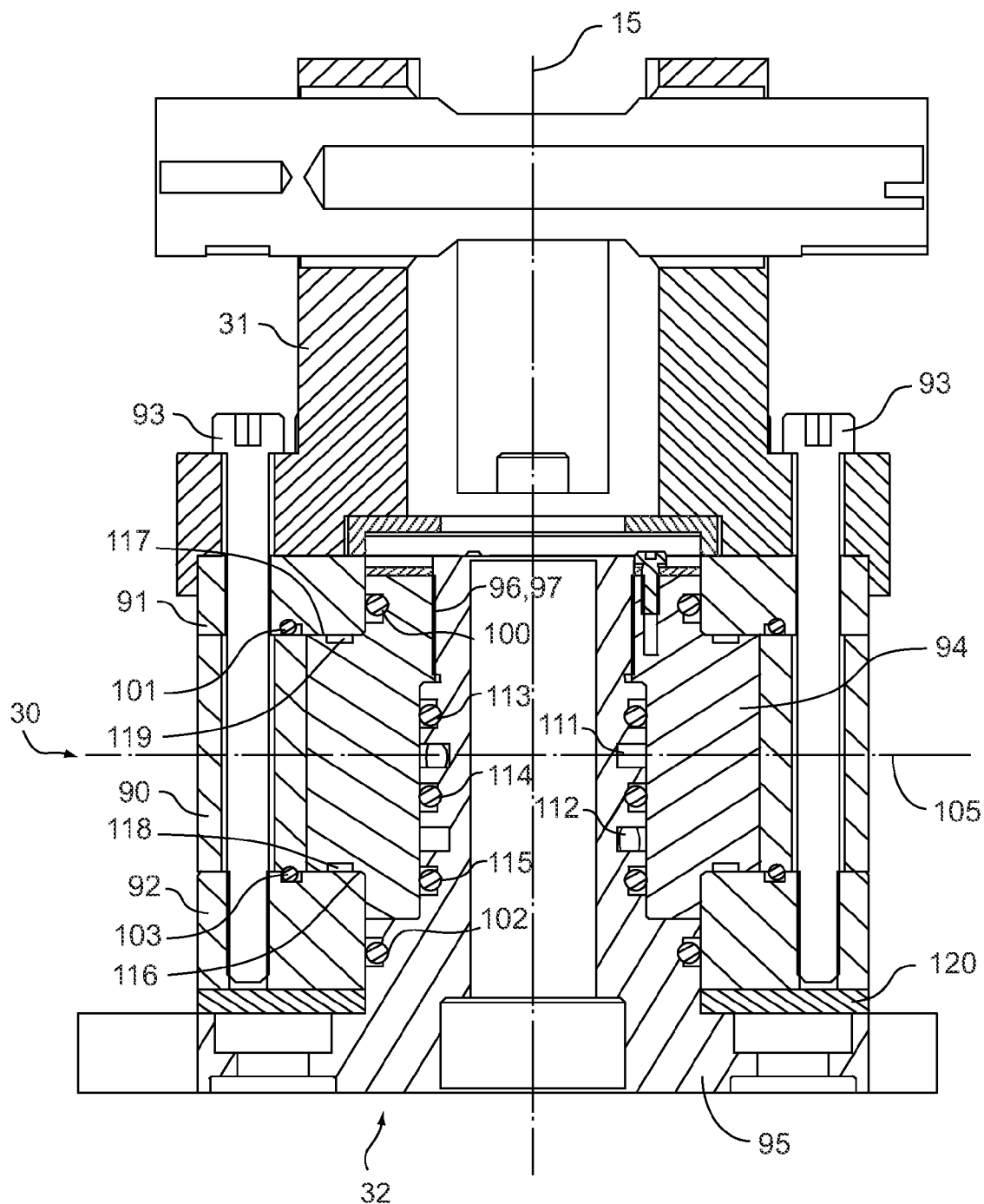
FIGS. 4, 5 and 6 represent in detail an actuator allowing the rotation of the ankle about a vertical axis.
Figure 5:
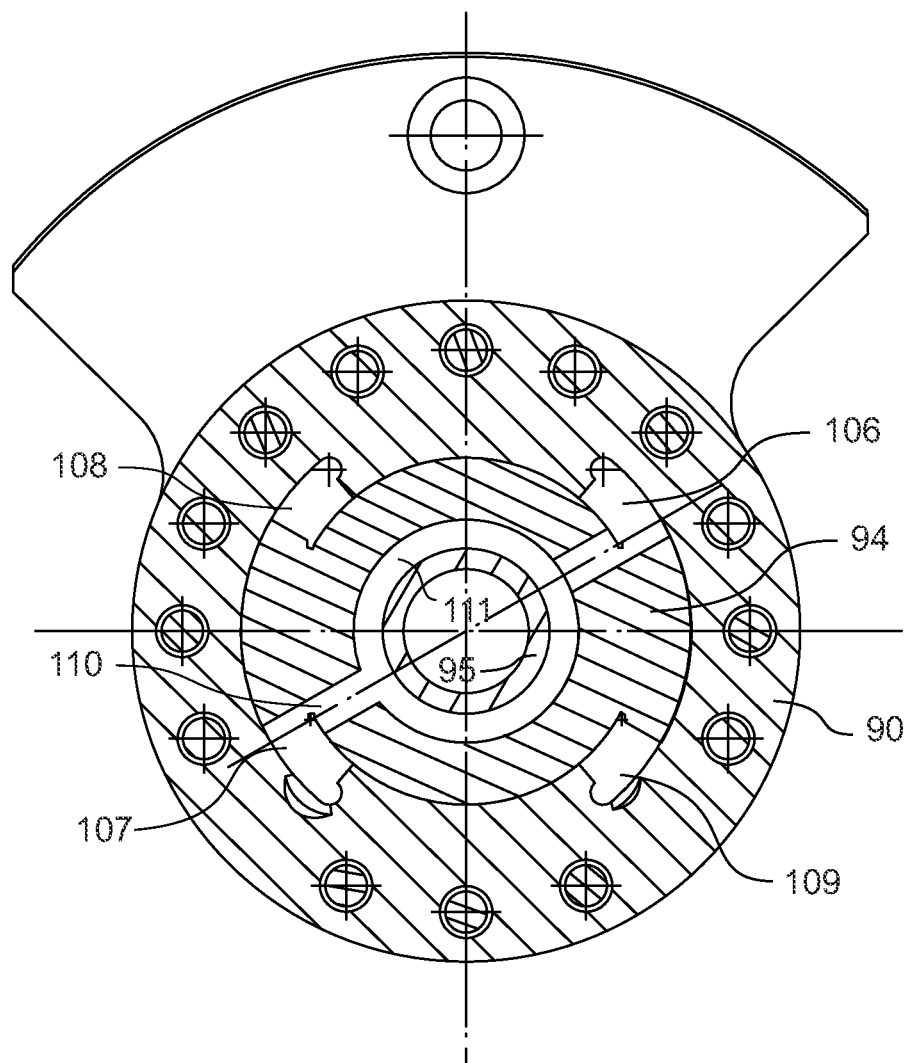
Figure 6:
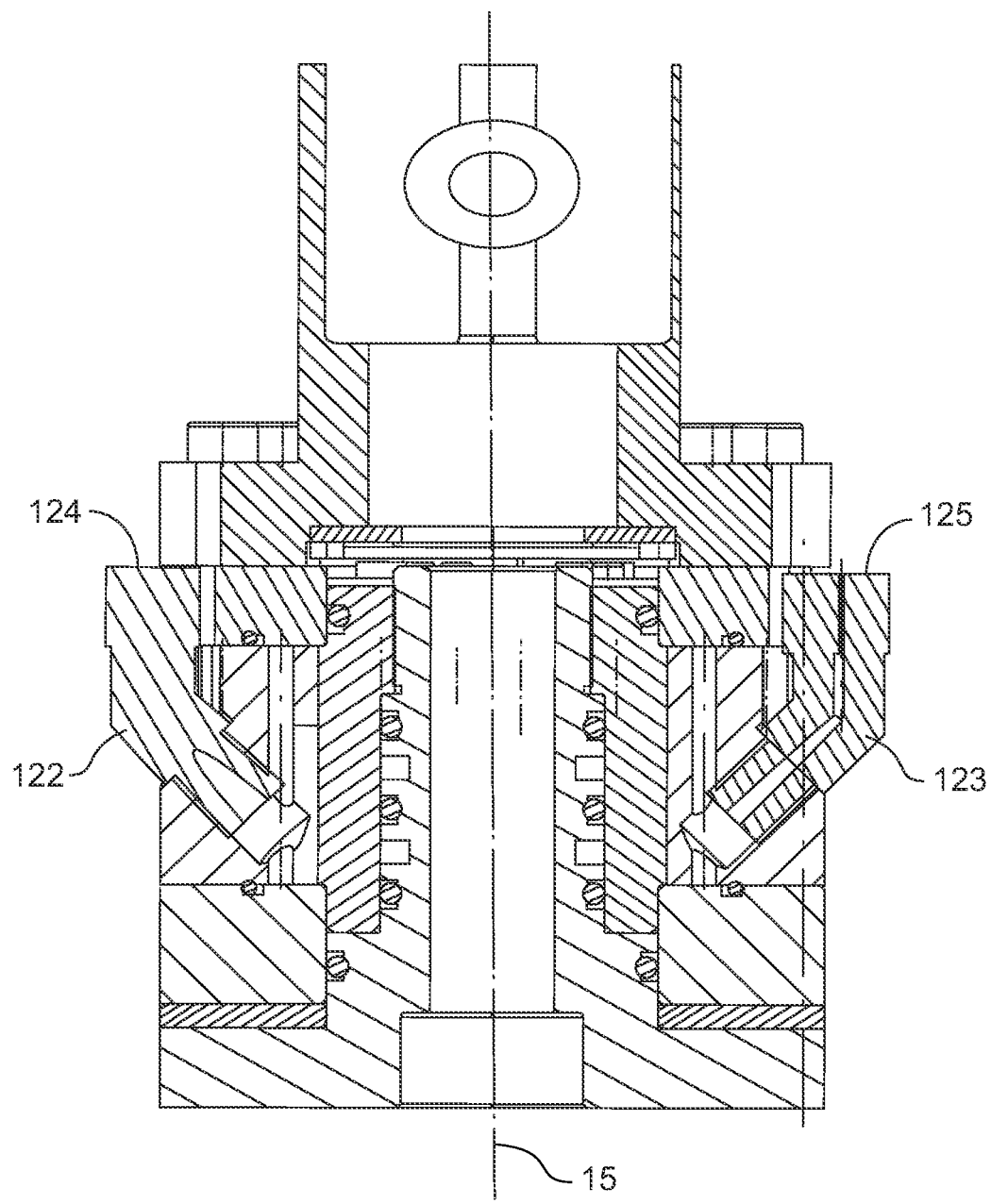

The actuator 14 allowing the foot 11 to rotate about the vertical axis 15 is clearly visible in FIGS. 4, 5 and 6. The actuator 14 is formed of a rotary hydraulic cylinder comprising the stator 30 and the rotor 32. The stator 32 comprises a liner 90 placed between two closure parts 91 and 92. The liner 90, the closure parts 91 and 92 and the bottom portion 31 of the knee are held together for example by means of screws 93.

The rotor 32 comprises a butterfly element 94 and an output shaft 95 secured together. The output shaft 95 is for example attached to the butterfly element 94 by means of a thread 96 placed in a bore 97 of the butterfly element 94. The bore 97 extends along the axis 15. The rods 23, 24 and 25 are secured to the output shaft 95. Seals 100, 101, 102 and 103, for example O-rings, provide the seal between the rotor 32 and the stator 30.

FIG. 5 is a view in section through a plane 105 perpendicular to the axis 15. Four chambers 106, 107, 108 and 109 are arranged between the butterfly element 94 and the liner 90. The chambers 106 and 107 communicate by means of a radial channel 110 extending in the plane of FIG. 5 while passing through the butterfly element 94 in order to emerge into an annular groove 111 carved out of the output shaft 95. Similarly the chambers 108 and 109 communicate by means of a radial channel, not shown, and emerge into a groove 112. This second radial channel and the groove 112 are made in a plane parallel to the plane 105. O-rings 113, 114 and 115 seal the grooves 111 and 112. A pressure difference of a hydraulic fluid between the two pairs of chambers, respectively 106 and 107, 108 and 109, makes it possible to rotate the rotary hydraulic cylinder.

In FIG. 5, the butterfly element 94 is shown in the middle position allowing a range of movement of approximately +/−20° about the axis 15 relative to this position. It is of course possible to increase the angular dimensions of the chambers 106, 107, 108 and 109 to obtain a greater range of movement. For example, in a configuration with four chambers, it is possible to obtain a range of movement of +/−40° about the axis 15. If, on the other hand, a smaller range of movement is sufficient, it will be possible to increase the number of chambers in order to increase the torque of the rotary cylinder or to reduce its radial dimensions while retaining the same torque.

The butterfly element 94 can rest between two flat surfaces 116 and 117 of the closure parts 91 and 92, surfaces perpendicular to the axis 15. Advantageously, the rotary cylinder comprises a hydrostatic film placed between the rotor 32 and the stator 30 in a plane perpendicular to the vertical axis of rotation 15. More precisely, the hydrostatic film is established between the flat surfaces 116 and 117 and the surfaces facing the butterfly element 94. The hydrostatic film is supplied by annular grooves 118 and 119 made in the butterfly element 94 and emerging facing the flat surfaces 116 and 117. The annular grooves 118 and 119 have for example a depth of the order of 0.5 mm. The hydrostatic film is limited by the seals 102 and 103 on the one hand, and 100 and 101 on the other hand. The hydrostatic film makes it possible to limit the friction between the rotor 32 and the stator 30. It also makes it possible to cushion possible vertical impacts that the foot 11 could register when the robot walks.

The rotary cylinder may also comprise a ring 120 in the form of a flat shim with an axis 15 placed between the closure part 92 and the output shaft 95 in order to limit the friction between these two parts. The ring 120 is made of a material having a low coefficient of friction with respect to the closure part 92 and the output shaft 95.

FIG. 6 shows the rotary cylinder in section in a vertical plane perpendicular to that of FIG. 4. The rotary cylinder comprises couplings 122 and 123 making it possible to supply the chambers 107 and 109 and the hydrostatic films with hydraulic fluid. Outlets 124 and 125 of the couplings are advantageously oriented parallel to the axis 15 in order to limit the radial space requirement of the leg 12.

Figure 7:
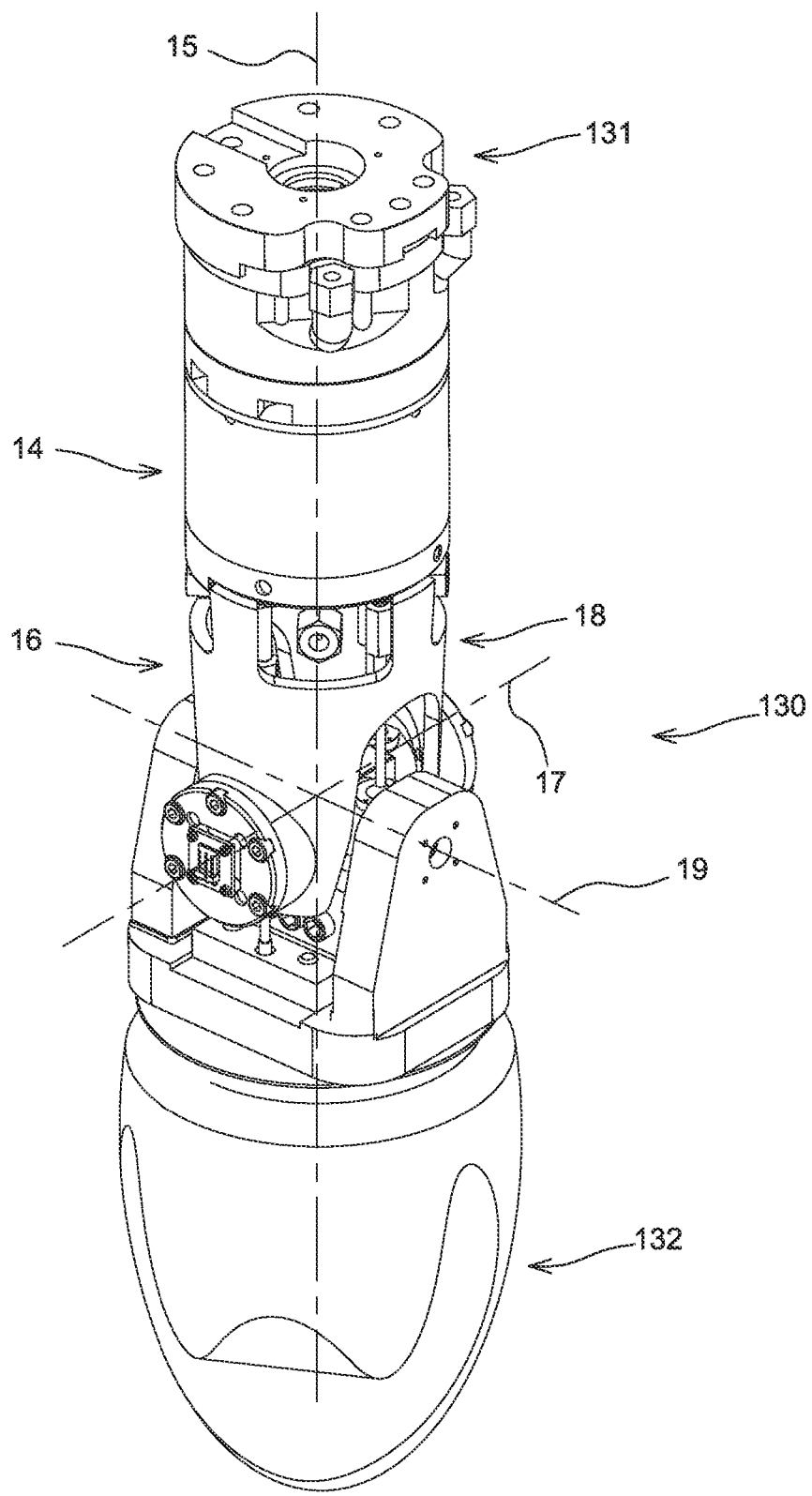
FIGS. 7 and 8 represent a wrist according to the invention.
Figure 8:
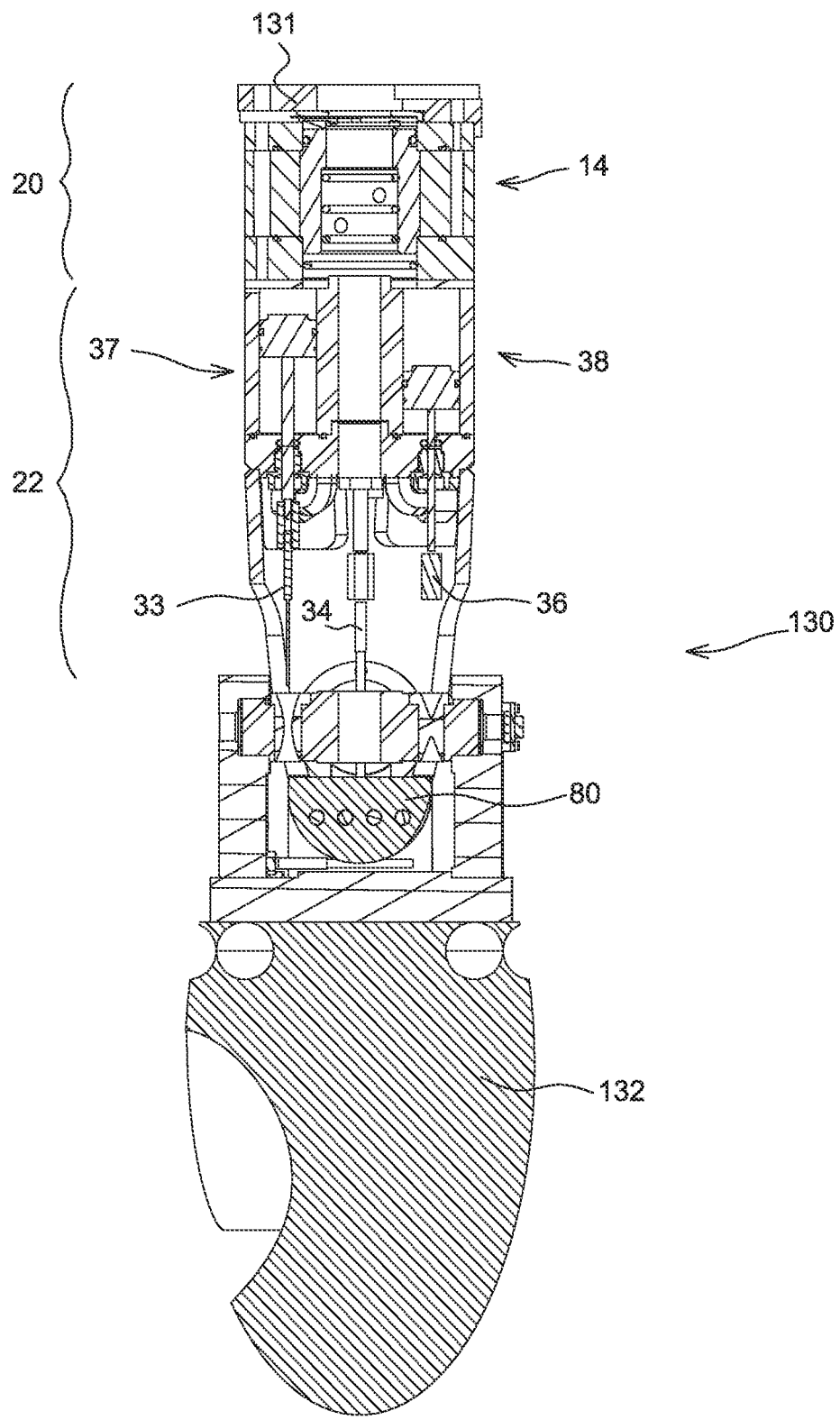

FIGS. 7 and 8 represent a wrist 130 according to the invention. FIG. 7 is a view in perspective of the wrist 130 and FIG. 8 is a view in section. The wrist 130 connects a forearm 131 of the robot and a hand 132 of the robot. In this wrist, there are actuators 14, 16 and 18 each allowing the hand 132 to rotate about an axis, respectively 15, 17 and 19, relative to the forearm 131. The actuator 14 acts in series on the assembly formed by the two actuators 16 and 18 acting in parallel on the hand. The actuator 14 is placed upstream of the two actuators 16 and 18 relative to the forearm 131.

FIG. 8 represents the wrist 130 in section in a plane containing the axes 15 and 19. In this view, there are the zones 20 and 22 containing the actuator 14 for the zone 20 and the actuators 16 and 18 for the zone 22. The zone 21 placed between the zones 20 and 22 is not shown, but the latter can be produced in order to place therein, for example, one or more hydraulic pumps making it possible to supply the actuators 14, 16 and 18.

As for the ankle, the actuator 14 of the wrist 130 is for example a rotary hydraulic motor. The actuators 16 and 18 are advantageously linear and act on the hand 132 in parallel by means of tie-rods. Shown in FIG. 8 are the tie-rods 33, 34 and 36. The description of the actuators 14, 16 and 18 made for the ankle can be completely repeated for the wrist 130. The connection between the actuators 16 and 18 and the hand 132 can be identical to that connecting the foot. It is possible notably to find therein an angle transmission made by means of the circular plate 80 for one of the two actuators 16 or 18 making it possible to increase the angular range of movement of the hand 132 on one of its axes of rotation.

Figure 9:
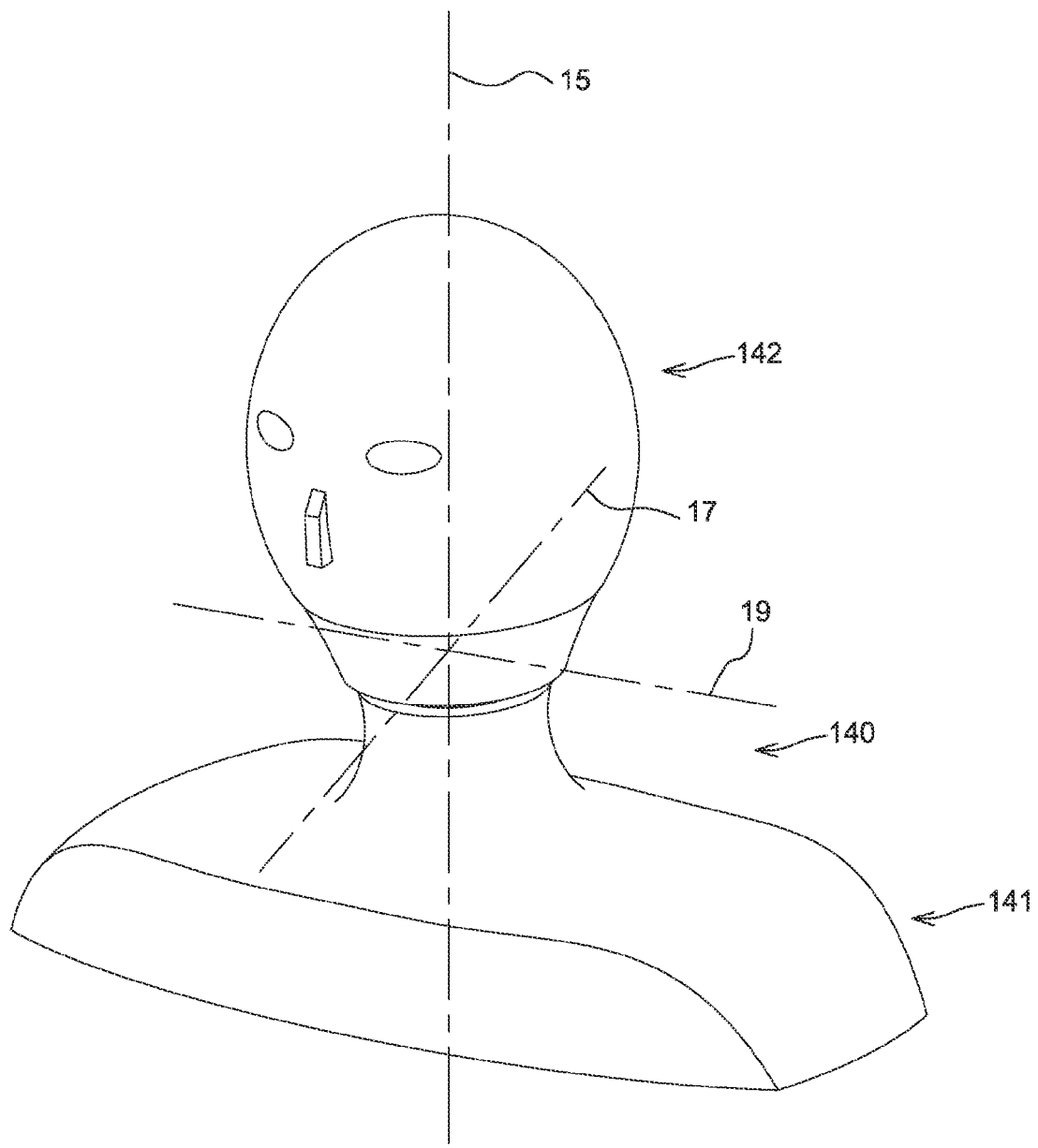
FIGS. 9 and 10 represent a neck according to the invention.
Figure 10:
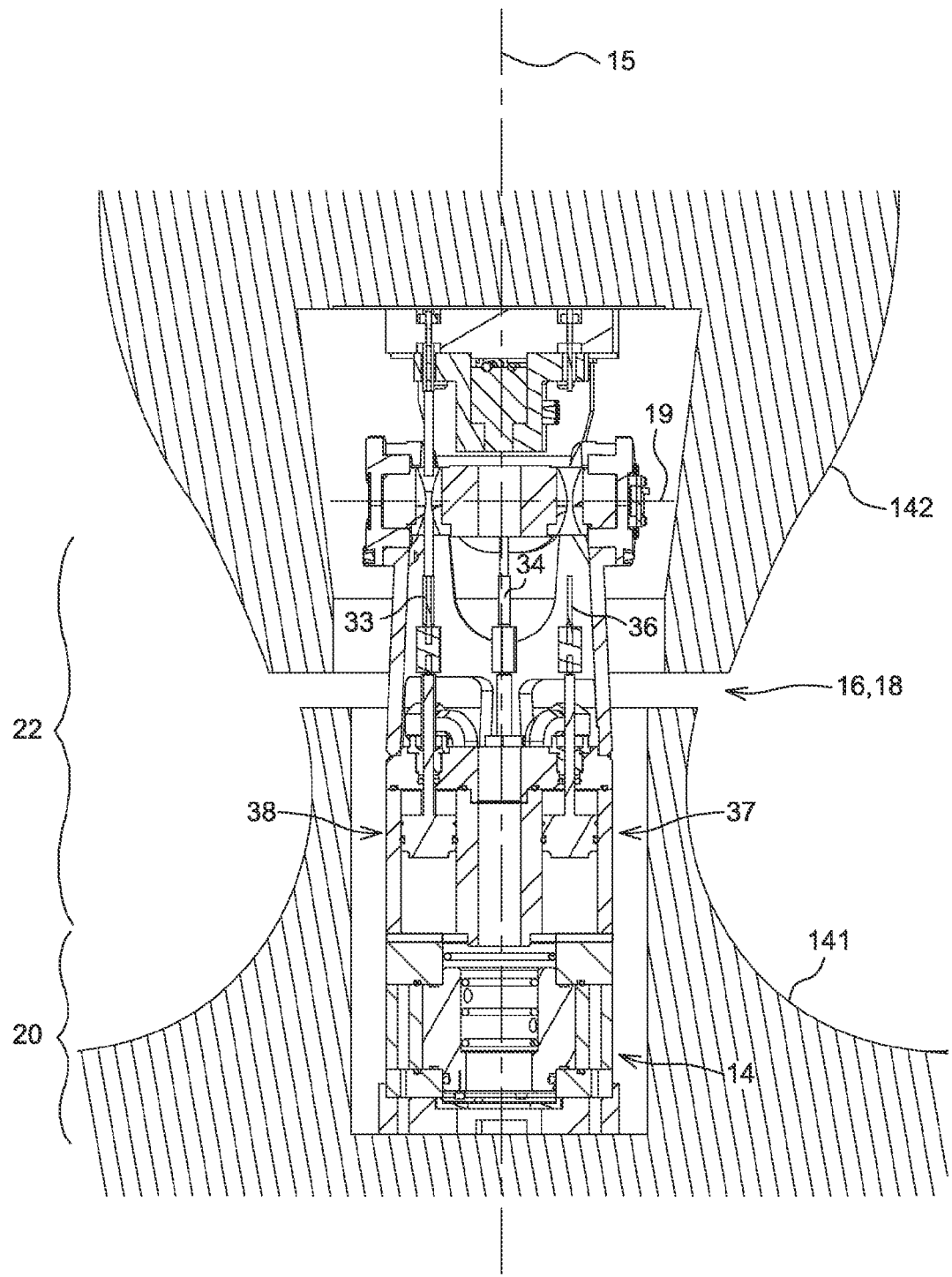

FIGS. 9 and 10 represent a neck 140 according to the invention. FIG. 9 is a view in perspective of the neck 140 and FIG. 10 is a view in section. The neck 140 connects a body 141 of the robot and a head 142 of the robot. In this neck 140 there are the actuators 14, 16 and 18 each allowing the head 142 to rotate about an axis, relative to the body 141. The axis 15 of the actuator 14 is a vertical axis of the body 141. The actuator 14 acts in series on the assembly formed by the two actuators 16 and 18 acting in parallel on the head 142. The actuator 14 is placed upstream of the two actuators 16 and 18 relative to the body 141.

FIG. 10 represents the wrist 130 in section in a plane containing the axis 15. In this view, there are the zones 20 and 22 containing the actuator 14 for the zone 20 and the actuators 16 and 18 for the zone 22. The zone 21 placed between the zones 20 and 22 is not shown, but the latter can be produced in order to place therein, for example, one or more hydraulic pumps making it possible to supply the actuators 14, 16 and 18. For the neck, it is advantageous to dispense with the zone 21 in order to reduce the inertia of the head when it rotates about the axis 15.

As for the ankle, the actuator 14 of the neck is for example a rotary hydraulic motor. The actuators 16 and 18 are advantageously linear and act on the head 142 in parallel by means of tie-rods. FIG. 10 shows the tie-rods 33, 34 and 36. The description of the actuators 14, 16 and 18 made for the ankle can be completely repeated for the neck 140. The connection between the actuators 16 and 18 and the head 142 can be identical to that connecting the foot. However, in the neck 140, there is no angle transmission for one of the two actuators 16 or 18. Specifically, the angular range of movement about the axes 17 and 19 is less than for other joints such as the ankle and the wrist.

The invention claimed is:

1. A humanoid robot, comprising:
   a first element connected to a second element by a joint, the joint having three degrees of freedom in rotation about three distinct axes including a first axis, a second axis, and a third axis;
   a first actuator configured to rotate the joint exclusively about the first axis;
   a second actuator configured to rotate the joint exclusively about the second axis; and
   a third actuator configured to rotate the joint exclusively about the third axis,
   wherein the third actuator is arranged in series with the first actuator and the second actuator, such that a rotor of the third actuator is coupled to both the first actuator and the second actuator,
   wherein the first actuator and the second actuator are distinct from one another, and the first actuator and the second actuator are arranged in parallel on the second element such that the first actuator and the second actuator each independently couple the first element to the second element,
   wherein the joint is an ankle that effects a movement of a foot relative to a leg, and
   wherein the second actuator effects rotation of the foot about a sagittal axis of the robot and is operated by means of a cable and an angle transmission located in the foot.

2. The humanoid robot as claimed in claim 1, further comprising a body, wherein the third actuator is located upstream of the first actuator and the second actuator relative to the body.

3. The humanoid robot as claimed in claim 1, wherein the first actuator, the second actuator, and the third actuator use hydraulic power.

4. The humanoid robot as claimed in claim 1, further comprising a body, wherein the second element is located furthest upstream relative to the body, and the third actuator is disposed at least partly within the second element.

5. The humanoid robot as claimed in claim 4, wherein the first actuator and the second actuator are linear and act by means of tie-rods,
   wherein the first element is located furthest downstream relative to the body, and
   wherein each of the tie-rods is attached to one of the first actuator or the second actuator, respectively, and each of the tie-rods is attached to the first element.

6. The humanoid robot as claimed in claim 5, wherein the first actuator and the second actuator include pistons moving along parallel axes.

7. The humanoid robot as claimed in claim 5,
   wherein the first actuator effects rotation of the foot about a frontal axis of the robot and is operated by means of a cable and of an angle transmission located in the foot.

8. The humanoid robot as claimed in claim 5, wherein each of the first actuator and the second actuator includes two single-acting cylinders, each of the two single-acting cylinders acting on one of the first element or the second element via one of the tie-rods.

9. The humanoid robot as claimed in claim 8, wherein each of the first actuator and the second actuator includes a hydraulic pump to generate a hydraulic pressure difference between two chambers each belonging to one of the two single-acting cylinders.

10. The humanoid robot as claimed in claim 1, wherein the third actuator comprises a rotary hydraulic cylinder including
    a stator,
    the rotor, and
    a hydrostatic film located between the rotor and the stator, in a plane perpendicular to an axis of rotation of the third actuator.

11. The humanoid robot as claimed in claim 1, wherein the joint includes a spherical joint.

12. A humanoid robot, comprising:
    a first element connected to a second element by a joint, the joint having three degrees of freedom in rotation about three distinct axes including a first axis, a second axis, and a third axis;
    a first actuator configured to rotate the joint exclusively about the first axis;
    a second actuator configured to rotate the joint exclusively about the second axis; and
    a third actuator configured to rotate the joint exclusively about the third axis,
    wherein the third actuator is arranged in series with the first actuator and the second actuator, such that a rotor of the third actuator is coupled to both the first actuator and the second actuator,
    wherein the first actuator and the second actuator are distinct from one another, and the first actuator and the second actuator are arranged in parallel on the second element such that the first actuator and the second actuator each independently couple the first element to the second element,
    wherein the joint is an ankle that effects a movement of a foot relative to a leg, and
    wherein the first actuator effects rotation of the foot about a frontal axis of the robot and is operated by means of a cable and of an angle transmission located in the foot.

13. A humanoid robot, comprising:
    a first element connected to a second element by a joint, the joint having three degrees of freedom in rotation about three distinct axes including a first axis, a second axis, and a third axis;
    a first actuator configured to rotate the joint exclusively about the first axis;
    a second actuator configured to rotate the joint exclusively about the second axis; and
    a third actuator configured to rotate the joint exclusively about the third axis,
    wherein the third actuator is arranged in series with the first actuator and the second actuator, such that a rotor of the third actuator is coupled to both the first actuator and the second actuator,
    wherein the first actuator and the second actuator are distinct from one another, and the first actuator and the second actuator are arranged in parallel on the second element such that the first actuator and the second actuator each independently couple the first element to the second element, and
    wherein each of the first actuator and the second actuator includes two single-acting cylinders, each of the two single-acting cylinders acting on one of the first element or the second element via tie-rods.

14. The humanoid robot as claimed in claim 1, wherein the first actuator and the second actuator are linear actuators, the first actuator and the second actuator being arranged on parallel axes.

15. The humanoid robot as claimed in claim 14, wherein the first actuator is operable to effect rotation about a frontal axis of the robot, and wherein the second actuator is operable to effect rotation about a sagittal axis of the robot, the sagittal axis being perpendicular to the frontal axis.

* * * * *